United States Patent

[11] 3,634,745

[72] Inventor Gerald J. Agin
    Redwood City, Calif.
[21] Appl. No. 40,950
[22] Filed May 27, 1970
[45] Patented Jan. 11, 1972
[73] Assignee International Business Machines Corporation
    Armonk, N.Y.

[54] DIGITAL VELOCITY SERVO FOR DC SERVOMOTOR
    3 Claims, 8 Drawing Figs.
[52] U.S. Cl. .................................................. 318/341, 318/327
[51] Int. Cl. .................................................. H02p 5/16
[50] Field of Search ....................................... 318/327, 341

[56] References Cited
    UNITED STATES PATENTS

| | | | |
|---|---|---|---|
| 3,506,901 | 4/1970 | Prezzi.......................... | 318/341 |
| 3,409,814 | 11/1968 | Azuma ......................... | 318/327 |
| 3,234,447 | 2/1966 | Sauber ......................... | 318/327 |
| 3,346,771 | 10/1967 | Sutton.......................... | 318/341 |
| 3,426,262 | 2/1969 | Colter .......................... | 318/341 |

Primary Examiner—Bernard A. Gilheany
Assistant Examiner—Thomas Langer
Attorneys—Hanifin and Jancin and Francis V. Giolma

ABSTRACT: In a digital velocity servosystem for a DC servomotor a fast recovery single shot is used to set an accelerate latch to provide drive for the motor in response to feedback pulses, which are also used to reset the accelerate latch, so that the drive is effective to force the motor to operate at a speed such that the interval between the feedback pulses is equal to the timing interval of the fast recovery single shot.

INVENTOR.
GERALD J. AGIN

BY Francis V. Giolma
ATTORNEY

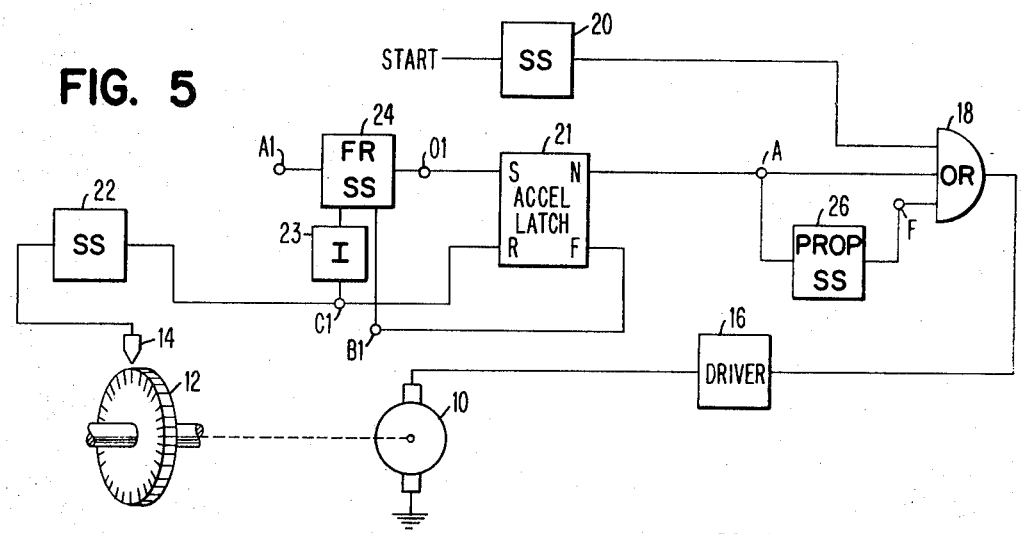
FIG. 5
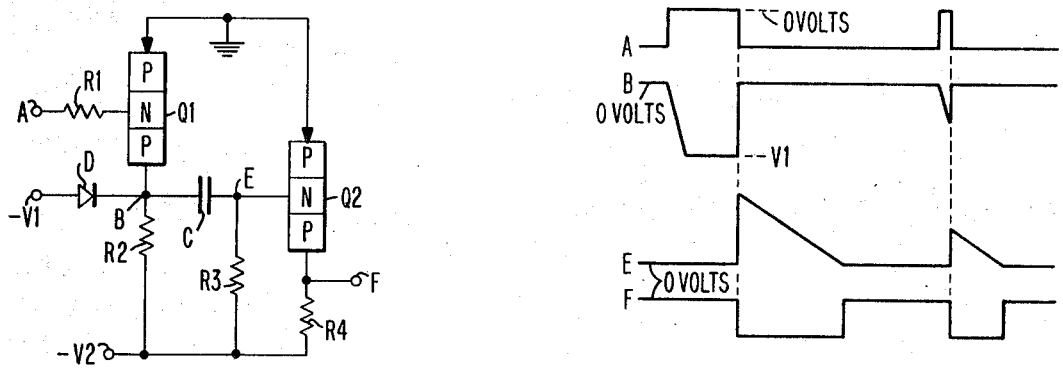
FIG. 7
FIG. 6
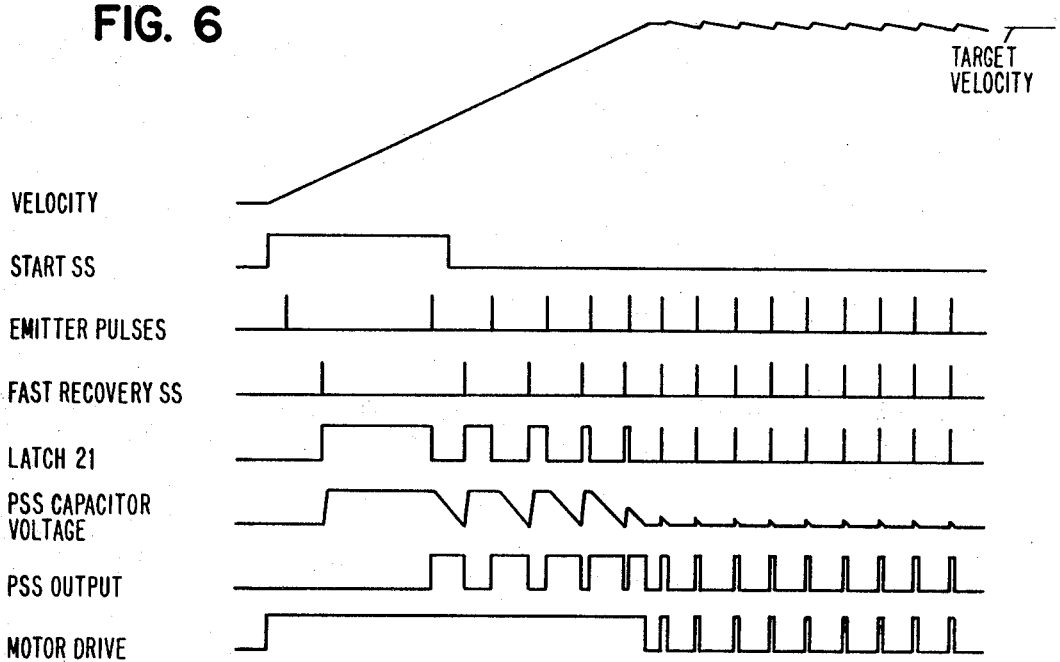
FIG. 8

DIGITAL VELOCITY SERVO FOR DC SERVOMOTOR

FIELD OF THE INVENTION

The invention relates generally to servomotors and it has reference in particular to servocontrol system for a printed circuit motor driving a carriage in a printer.

DESCRIPTION OF THE PRIOR ART

Servosystems have heretofore generally used oscillators and the like to provide timing pulses for controlling the operation of the servomotor to maintain a predetermined speed.

SUMMARY OF THE INVENTION

Generally stated, it is an object of this invention to provide an improved digital velocity control system for a printed circuit motor.

More specifically, it is an object of this invention to provide a velocity control system for a DC motor which applies to the motor drive circuit a pulse-width modulated drive signal proportional to the error in velocity.

Another object of the invention is to provide for using a resettable, fast recovery single shot for providing the reference timing interval for the drive of a DC servomotor.

Yet another object of the invention is to provide for using a fast recovery single shot to operate an accelerate latch and determine the interval for which drive is applied to a servomotor.

It is also an object of the invention to provide for using a proportional single shot with an accelerate latch to regulate the interval during which drive is applied to a DC servomotor.

The foregoing and other objects, features, and advantages of the invention will be apparent from the following more particular descriptions of preferred embodiments of the invention as illustrated in the accompanying drawing.

DESCRIPTION OF THE DRAWING

In the drawing:

FIG. 5 is a schematic circuit diagram showing a modified form of digital velocity servosystem embodying the invention in a different form.

FIG. 6 is a circuit diagram showing details of the proportional single shot used in FIG. 5.

FIG. 7 shows waveforms illustrating the operation of the proportional single shot of FIG. 6.

FIG. 8 shows waveforms illustrating the operation of the digital velocity control system of FIG. 5.

DESCRIPTION OF A PREFERRED EMBODIMENT

Figure 1:
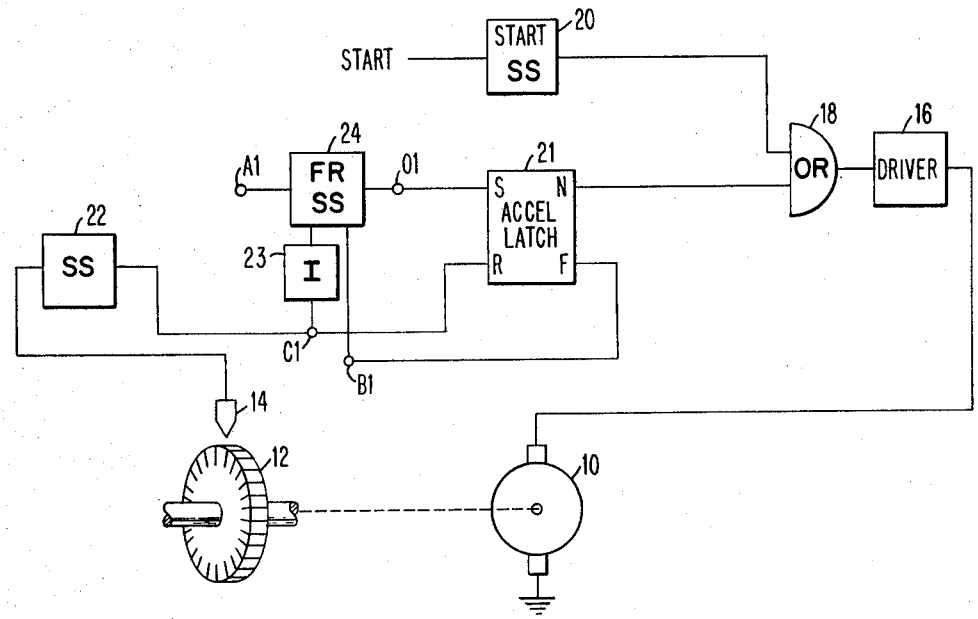
FIG. 1 is a schematic circuit diagram of a velocity feedback control system embodying the principal features of the invention.

Referring to FIG. 1, the reference numeral 10 represents a schematic showing of a DC servomotor provided with a slotted emitter timing wheel 12 having a pickup 14 for producing feedback timing pulses in response to operation of the motor. The motor 10 is energized through a suitable driver circuit 16 from an OR 18. The motor 10 is started by means of a start single shot 20 connected to the OR 18 to produce a start pulse in response to an input start signal. Continued operation of the motor 10 is in response to feedback pulses from the emitter timing wheel 12, which is connected to reset bistable switch means such as accelerate latch 21 through a 10 microsecond single shot 22 and an inverter 23. A fast recovery single shot 24 is connected to be set by the single shot 22 for setting the accelerate latch 21 at the end of a predetermined timing interval. In this way, pulses from the emitter timing wheel 12 are compared with the timing interval for the fast recovery single shot 24 for controlling the ON duration of the latch 21, which determines the interval that drive is applied to the motor 10. Inverter 23 is used to coordinate the use of positive and negative logic circuit elements.

The fast recovery single shot 24 determines a reference timing interval which in the present instance is 250 microseconds. Each time the emitter timing wheel 12 produces a pulse it is applied to the single shot 22 to set the fast recovery single shot 24, the fast recovery single shot 24 will emit a short pulse a predetermined interval latter, provided no further timing wheel pulses occur during this interval. If another pick up pulse should occur from the emitter timing wheel 12 during the timing interval, the fast recovery single shot 24 will reset without emitting any pulse and will begin a new timing interval.

The system described will try to force the motor 10 to rotate at a speed such that the interval between feedback pulses from the emitter timing wheel 12 is equal to the timing interval of the fast recovery single shot 24. If the motor 10 is turning slower than this ideal speed, the accelerate latch 21 will be set for a time equal to the difference between the two intervals, thus applying to the motor drive circuit 16 a pulse-width modulated drive signal proportional to the error in velocity. If the motor 10 is rotating faster than the ideal speed, the fast recovery single shot 24 will never fire, the latch 21 will not be set, and the motor 10 must coast down to its target velocity.

Figure 2:
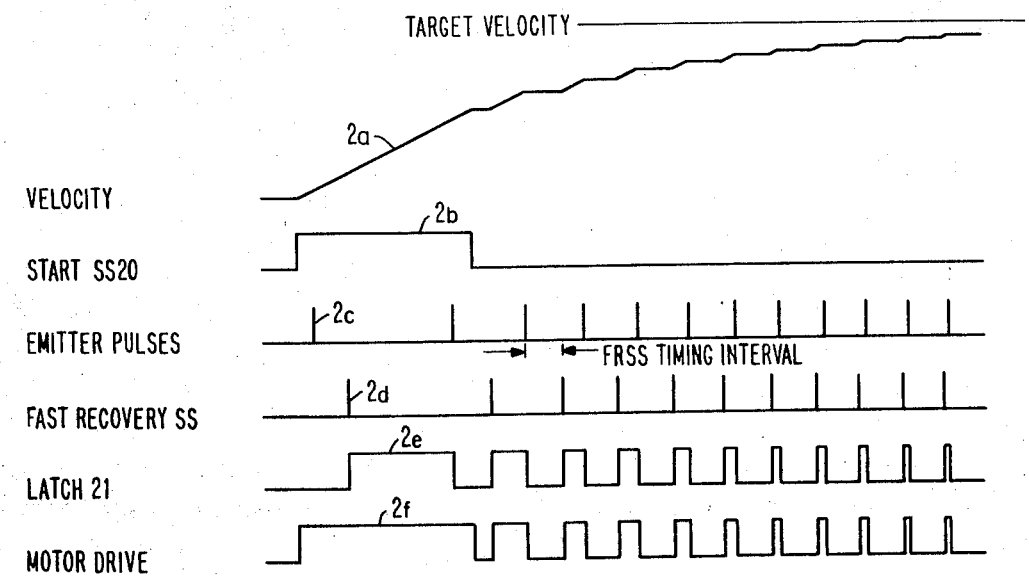
FIG. 2 shows a set of waveforms illustrating the operation of the circuit of FIG. 1.

The start single shot 20 is provided to initiate the servoing action and bring the motor 10 at least part way up to speed. Once the start single shot 20 times out, response is exponential with a time constant equal to the target velocity divided by the applied acceleration. By referring to the waveforms 2a-2f of FIG. 2, the timing relationships between the emitter pulses, the fast recovery single shot and the latch in effecting the motor drive can be clearly understood.

Figure 3:
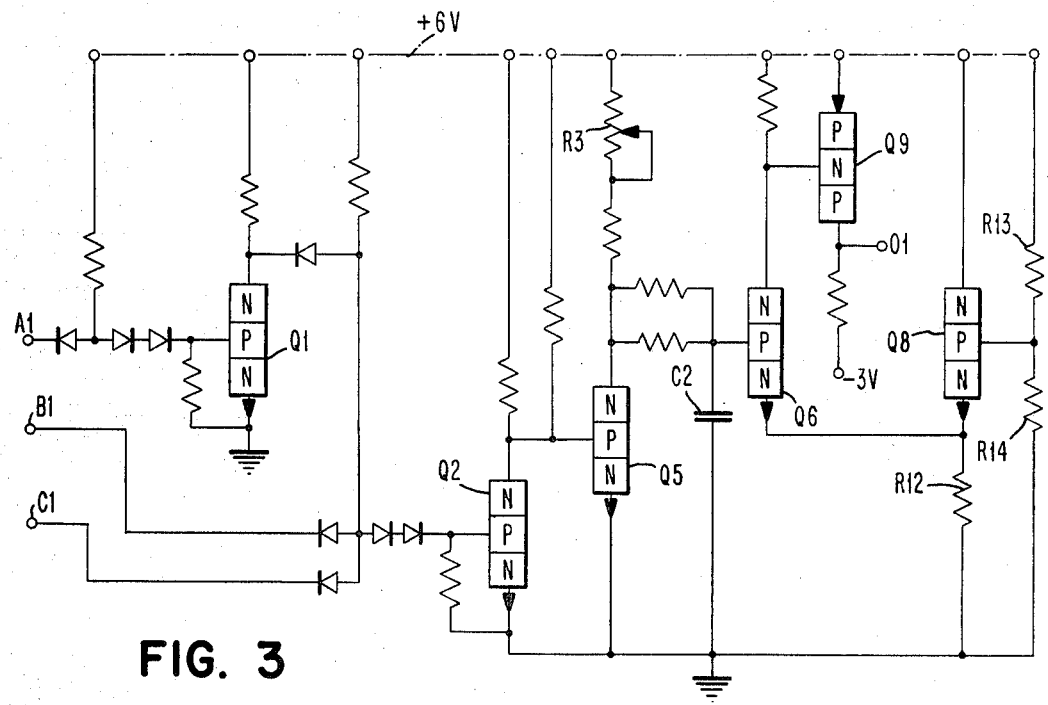
FIG. 3 is a circuit diagram showing one form of fast recovery single shot which may be used in the control circuit of FIG. 1.
Figure 4:
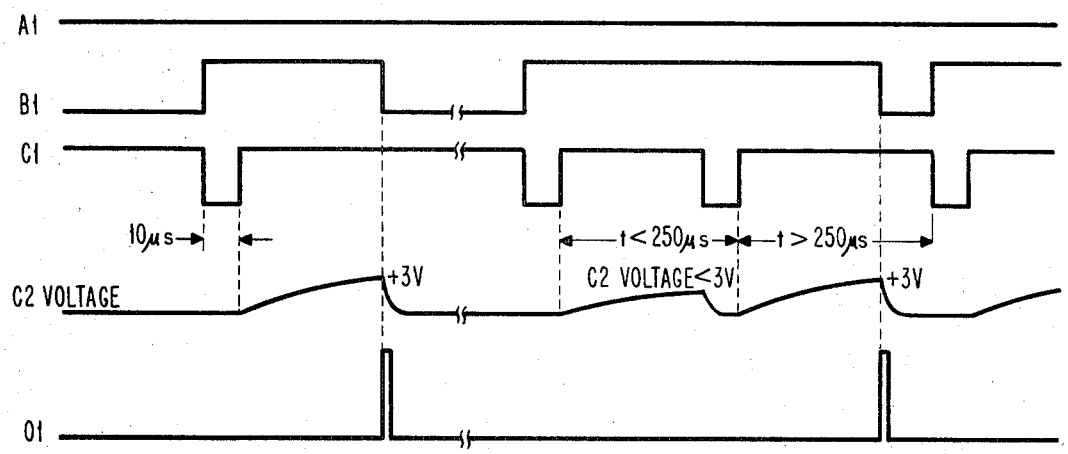
FIG. 4 shows a set of waveforms illustrating the operation of the fast recovery single shot of FIG. 3.

Referring to FIG. 3, it will be seen that the fast recovery single shot 24 has three inputs. A1, B1 and C1. With the input A1 at a ground level a transistor Q1 will be at an up level and transistor Q2 can be controlled by the inputs B1 and C1. As shown in FIG. 1, the input B1 is connected to the OFF output of the accelerate latch 21, which is reset when the input C1 goes to its down level. The reset pulse at C1 puts input B1 in an up level and remains there until an output pulse is seen at the output O1. At this point, the input B1 goes to its down level. When either B1 or C1 are in a down level, transistor Q5 will be in a down level. This allows capacitor C2, which charges through adjustable resistor R3, to discharge through transistor Q5 in approximately 5 microseconds. This turns transistor Q9 off, causing the output O1 to be in its down level. At this time, input B1 is in its up level due to input C1 going to its down level. When input C1 goes to its up level, transistor Q5 will turn off allowing capacitor C2 to charge to transistor Q6's threshold value, which is determined by the reference source including transistor Q8, and resistors R12, R13 and R14. This turns on transistor Q9 causing an up level at output O1. The up level at output O1 sets the accelerate latch 21 producing a down level at input B1 which discharges capacitor C2. This turns transistor Q9 off, producing a down level at output O1. Hence, transistor Q9 is on only long enough to set the latch 21. If a down level at input C1 occurs before a down level at input B1, there will be no output pulse, since the capacitor C2 will be discharged and a new charging interval will commence. Hence, the latch 21 will not be set. If a down level at input C1 occurs after a down level at input B1, there will be output pulse from the fast recovery single shot 24 and the latch 21 will be set. The timing relations for operation of the fast recovery single shot 24 may be understood by referring to the output waveforms of FIG. 4.

Referring to FIG. 5, it will be seen that the circuit shown is basically the same as that of FIG. 1, but the operation of this system is significantly improved by the addition of a proportional single shot 26, which is connected between the latch 21 and the OR 18. A schematic diagram of the proportional single shot 26 is shown in FIG. 6 and typical waveforms for the proportional single shot are shown in FIG. 7. The proportional single shot 26 of FIG. 6 is similar to that described in copending application, Ser. No. 665,539 of Gerald J. Agin et al., filed Sept. 5, 1967 and entitled "Proportional Damping for Motor Drive." When transistor Q1 is cut off by raising its base positive, capacitor C begins to charge through the path consisting of the emitter base junction of transistor Q2, capacitor C and resistor R2. If transistor Q1 is cut off enough to allow point B to reach a voltage $-V_1$, diode D will conduct, clamping the capacitor C and not allowing it to charge further. When transistor Q1 is allowed to conduct again, point B will be raised to ground potential, and because the voltage across capacitor C cannot change instantaneously, (the voltage at point E will be raised above ground potential, cutting off transistor Q2 and producing a negative output pulse) capacitor C will discharge through the path consisting of transistor Q1, capacitor C and resistor R3 until base current from transistor Q2 clamps point E at ground and the output pulse is terminated. If the input is held on for long enough to allow diode D to conduct, the output pulse length will be determined by the time constant R3C. If the input pulse is not held on long enough to allow diode D to conduct, the output pulse length will be determined by the length of time the input pulse was held on, and the ratio of time constants R3C and R2C.

The operation of this circuit may be summarized by noting that the capacitor C is charged at one rate by the input pulse and allowed to discharge at another rate when the input pulse is removed. The output switches its state during the discharge of capacitor C.

As with the previously discussed version of the servocontrol system, the latch 21 will be set for a time equal to the difference between the interval of the feedback pulses from the emitter timing wheel 12 and the timing interval of the fast recovery single shot 24, providing a pulse-width modulated drive signal at OR 18, which is proportional to the error in velocity. However, with the proportional single shot 26 OR'ed into the drive signal by OR 18, the constant of proportionality between the error velocity and the drive may be regulated by adjusting single shot 26 to give a long output pulse in response to a short input pulse, more drive will be applied to the motor 10 for a given error in velocity, and tighter speed regulation and faster response will be attained.

The limiting value to which the pulse-width magnification ratio may be raised is such that if a velocity error exists at any given time, the motor 10 may be expected to exactly make up the difference in one pulse, before the next feedback pulse arrives, or the present timing interval expires. If the ratio is increased above this limit, overcompensation will occur. For an inertial system with no friction, this optimum ratio is derived in the appendix. In a system in which friction may be relied upon to be constant, this ratio may be increased. If there is some small inaccuracy or irregularity in the pulses from the emitter timing wheel 12, a lower magnification ratio may be desirable.

The motor 10 on starting, should come up to speed at a maximum acceleration until target velocity is reached. It is important that the maximum output pulse length of the proportional single shot 26 when the clamp diode D is allowed to conduct, be approximately equal to the timing interval of the fast recovery single shot 24. After the start single shot 20 times out, the proportional single shot 26 will allow the clamp diode D to conduct for every feedback pulse until the motor is almost up to speed. In the last timing interval the motor should come exactly up to speed, if the magnification ratio is set properly and if at the start of the timing interval, the capacitor C in the proportional single shot 26 completely discharged.

In practice the values of the time constants R2C and R3C of the proportional single shot 26 will be adjusted dynamically to give the best up-to-speed characteristic.

The emitter timing wheel 12 may be magnetic, optical, capacitive or inductive. The fast recovery single shot 24 may be adapted from the oscillator described in the disclosure of G. Melnyk, which was published in the International Business Machines Technical Disclosure Bulletin for May, 1966 on page 1739. Instead of using a clamp diode D, the circuit might be designed to rapidly discharge any voltage remaining on the capacitor C whenever the input initiates a new charging cycle. A proportional single shot may also be applied to a reverse drive signal such as that by R. J. Houdlin et al., U.S. Pat. No. 3,154,730, entitled "Speed Control of a DC Motor," which issued Oct. 27, 1964. The servocontrol system may be applied to any rotary or linear actuator which develops a torque, force or acceleration in response to a pulse DC drive signal.

From the above description and the accompanying drawing it will be apparent that a digital velocity control system is provided wherein the error in velocity is determined by comparing the interval between pulses from a timing wheel to pulses from a resettable reference timer. In the embodiment described, the correction applied to the motor is proportional to the actual difference measured, and a magnification ratio may be applied to permit the motor to correct in one feedback cycle any error which existed on a previous cycle. The described system provides stable operation with optimum velocity regulation, optimum up-to-speed characteristics, and a simplicity of implementation in a DC drive.

While the invention has been particularly shown and described with reference to preferred embodiments thereof, it will be understood by those skilled in the art that various changes in form and details may be made therein without departing from the spirit and scope of the invention.

APPENDIX

Derivation of Optimum Magnification Ratio

Assume a motor rotating at a velocity $\omega$ (radians per second) which is less than a target velocity $\omega_s$. Assume the timing wheel emits N pulses per revolution, and that the application of forward drive will produce a forward acceleration $\alpha$ (in radians per second per second).

Pulse interval (from timing wheel) $T = \dfrac{1}{2\pi N\omega}$

Reference interval (from Fast Recovery Single Shot)

$$T_s = \frac{1}{2\pi N\omega_s}$$

Difference in interval (input to Proportional Single Shot)

$$T_{in} = T - T_s = \frac{1}{2\pi N\omega} - \frac{1}{2\pi N\omega_s} = \frac{\omega_s - \omega}{2\pi N\omega\omega_s}$$

Desired pulse length to accelerate Motor (Proportional Single Shot output)

$$T_{out} = \frac{(\omega_s - \omega)}{\alpha}$$

Pulse magnification ratio $$\frac{T_{out}}{T_{in}} = \frac{(\omega_s - \omega)/\alpha}{(\omega_s - \omega)/2\pi N\omega\omega_s} = 2\pi N\frac{\omega\omega_s}{\alpha} \simeq 2\pi N\frac{\omega_s^2}{\alpha}$$

If the available acceleration may be assumed to be constant at all speeds we may derive an alternative formula:

Time to accelerate from 0 to $\omega_s$ $T_\alpha = \omega_s/\alpha$

Reference interval $T_s = \dfrac{1}{2\pi N\omega_s}$

Pulse magnification ratio $$2\pi N\frac{\omega_s^2}{\alpha} = \frac{T_\alpha}{T_s}$$

What is claimed is:

1. In a control system for a motor having an armature with drive circuit means for energizing said armature and having emitter means driven by said armature for producing feedback pulses,
   means including a start single shot connected to apply a start pulse to said drive circuit means,
   switch means comprising a latch connected to said drive circuit means to effect energization of said armature and to said emitter means to be reset thereby,
   and means including a resettable single shot connected to said emitter means to be set thereby and to said switch means to set said switch means after a predetermined time interval in response to said feedback pulses and be reset in response to reset of said switch means for controlling the operation of said switch means in accordance with feedback pulses from said emitter means, said resettable single shot being reset by an additional feedback pulse occurring before said switch means is set by said resettable single shot.

2. The invention as defined in claim 1 characterized by an OR circuit connecting said latch means and said start single shot to said drive circuit means, and a proportional single shot connected between the said latch means and said OR circuit means to extend the duration of the operation of said drive circuit means.

3. The invention as defined in claim 2 characterized by said proportional single shot providing a long output pulse in response to a short input pulse whereby more drive is applied to said motor by said drive circuit means and tighter regulation and faster response is attained.

* * * * *